United States Patent
Milanesi et al.

(10) Patent No.: US 9,086,710 B1
(45) Date of Patent: Jul. 21, 2015

(54) ZERO-POLE COMPENSATOR CIRCUITS WITH IMPEDANCE REDUCTION MULTIPLIERS

(71) Applicant: Maxim Integrated Products, Inc., San Jose, CA (US)

(72) Inventors: Andrea Milanesi, Milan (IT); Stefano Casula, Assago (IT)

(73) Assignee: MAXIM INTEGRATED PRODUCTS, INC., San Jose, CA (US)

( * ) Notice: Subject to any disclaimer, the term of this patent is extended or adjusted under 35 U.S.C. 154(b) by 206 days.

(21) Appl. No.: 13/759,298

(22) Filed: Feb. 5, 2013

(51) Int. Cl.
*G05F 1/445* (2006.01)
*H03F 3/68* (2006.01)

(52) U.S. Cl.
CPC . *G05F 1/445* (2013.01); *H03F 3/68* (2013.01)

(58) Field of Classification Search
CPC .. G05F 1/575; H03F 1/3247; H03F 2200/171
USPC ......... 327/100, 102, 265, 223, 551–556, 292, 327/252; 330/292, 303, 260, 278; 323/271–276, 351–353
See application file for complete search history.

(56) References Cited

U.S. PATENT DOCUMENTS

| | | | | |
|---|---|---|---|---|
| 6,222,418 B1 * | 4/2001 | Gopinathan et al. | .......... | 330/292 |
| 7,019,502 B2 * | 3/2006 | Walters et al. | ................ | 323/282 |
| 7,095,287 B2 * | 8/2006 | Maxim et al. | ................... | 331/44 |
| 7,518,428 B2 * | 4/2009 | Ichiba et al. | .................. | 327/223 |
| 7,760,019 B2 * | 7/2010 | Johansson | .................... | 330/252 |
| 8,334,682 B2 * | 12/2012 | Chiu et al. | .................... | 323/282 |
| 8,773,199 B2 * | 7/2014 | Wan | .............................. | 330/103 |

* cited by examiner

*Primary Examiner* — Rajnikant Patel (57) ABSTRACT

A compensator circuit includes a first transconductance amplifier to convert an input voltage to a first output current. A second transconductance amplifier converts the input voltage to a second output current. A buffer includes an input and an output. The input of the buffer receives the second output current. A resistance is connected between an output of the first transconductance amplifier and an output of the buffer. A capacitance connected (i) between an output of the second transconductance amplifier and a terminal at a reference potential, and (ii) between the input of the buffer and the terminal. An output voltage of the compensator circuit is based on the first output current and is a voltage across the resistance, the buffer and the capacitance.

22 Claims, 6 Drawing Sheets

ZERO-POLE COMPENSATOR CIRCUITS WITH IMPEDANCE REDUCTION MULTIPLIERS

FIELD

The present disclosure relates to analog circuits and power supplies, and more particularly to zero pole compensator circuits used in voltage converters and voltage regulators.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Figure 1:
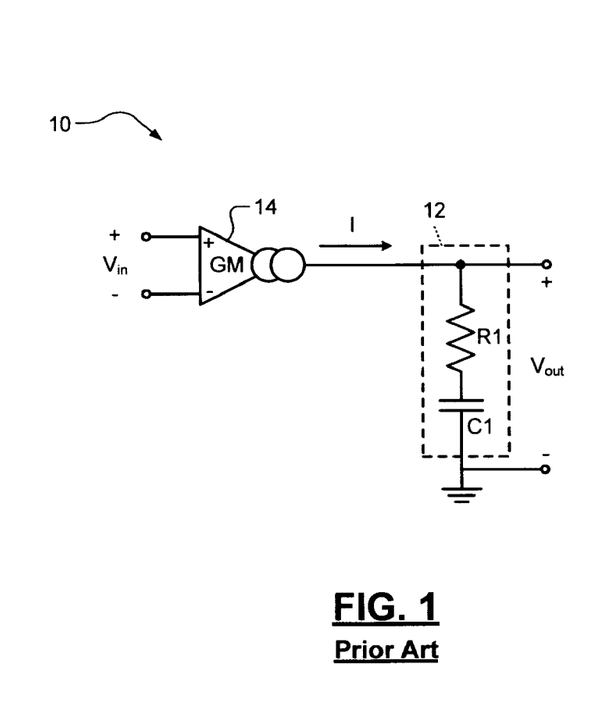
FIG. 1 is a zero-pole compensator circuit incorporating a traditional RC loop filter.

DC-to-DC converters and linear voltage regulators typically include a zero-pole compensator circuit for stability purposes. FIG. 1 shows a traditional zero-pole compensator circuit 10 that includes a RC loop filter 12, which is connected to an output of a transconductance amplifier (voltage-to-current converter) 14. The transconductance amplifier 14 converts an input voltage to an output current I. The RC loop filter 12 includes a resistance R1 and a capacitance C1. The resistance R1 is connected in series with the capacitance C1 and filters an output voltage of the transconductance amplifier 14. Voltage across the RC loop filter 12 is identified as an output voltage $V_{out}$.

As an example, a transfer function of the zero-pole compensator circuit 10 can be represented as provided by equation 1, where $V_{in}$ is the input voltage of the zero-pole compensator circuit 10, $V_{out}$ is an output voltage of the zero-pole compensator circuit 10, GM is a transconductance value of the transconductance amplifier 14, s is equal to jω, j is the imaginary value $\sqrt{-1}$ is frequency, R1 is a value of the resistance R1, and C1 is a value of the capacitance C1.

$$\frac{V_{out}}{V_{in}} = GM\left[\frac{1+sR1C1}{sC1}\right] \quad (1)$$

The RC loop filter 12 provides a single zero and a single pole. In other words, there is a single value for s that can result in the numerator of the transfer function being equal to zero and there is a single value for s that can result in the denominator of the transfer function being equal to zero.

SUMMARY

A compensator circuit is provided and includes a first transconductance amplifier to convert an input voltage to a first output current. A second transconductance amplifier converts the input voltage to a second output current. A buffer includes an input and an output. The input of the buffer receives the second output current. A resistance is connected between an output of the first transconductance amplifier and an output of the buffer. A capacitance connected (i) between an output of the second transconductance amplifier and a terminal at a reference potential, and (ii) between the input of the buffer and the terminal. An output voltage of the compensator circuit is based on the first output current and is a voltage across the resistance, the buffer and the capacitance.

In other features, a compensator circuit is provided and includes a first transconductance amplifier including a first output and converting an input voltage to a first current. A second transconductance amplifier includes an input and a second output. The input of the second transconductance amplifier receives the input voltage. The second output receives a second current. A resistance connected between the first output of the first transconductance amplifier and the second output of the second transconductance amplifier. A portion of the first current is provided as the second current and directed from the resistance to the second output of the second transconductance amplifier. A capacitance is connected (i) between the second output of the second transconductance amplifier and a terminal at a reference potential, and (ii) between the resistance and the terminal. An output voltage of the compensator circuit is a voltage across the resistance and the capacitance.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The RC loop filter 12 shown in FIG. 1 is an RC loop filter that is driven by the transconductance amplifier 14. The RC loop filter 12 generates a single zero and a single pole. The value of the capacitance C1 and/or the resistance R1 can be large and as a result the size of the capacitance C1 and the resistance R1 can be large. For this reason, the capacitance C1 and the resistance R1 can be discrete components separate from the transconductance amplifier 14.

The below described implementations provide zero-pole compensator circuits with reduced capacitance and resistance sizes relative to traditional zero-pole compensator circuits (e.g., the zero-pole compensator circuit 10 of FIG. 1). Reduced capacitance and/or resistance sizes can allow the zero-pole compensator circuits to be incorporated into an integrated circuit (IC). The capacitances and resistances may be formed on silicon layers of the ICs. This reduces a number of discrete components, an overall component count, and a number of package pins of the IC.

Although the zero-pole compensator circuits and RC loop filters disclosed herein are primarily described with respect to being implemented in DC-to-DC converters and linear voltage regulators, these implementations are provided as examples only. The zero-pole compensator circuits and RC loop filters may be implemented in other voltage converters, voltage regulators, and/or circuits in which a RC loop filter is used.

Figure 2:
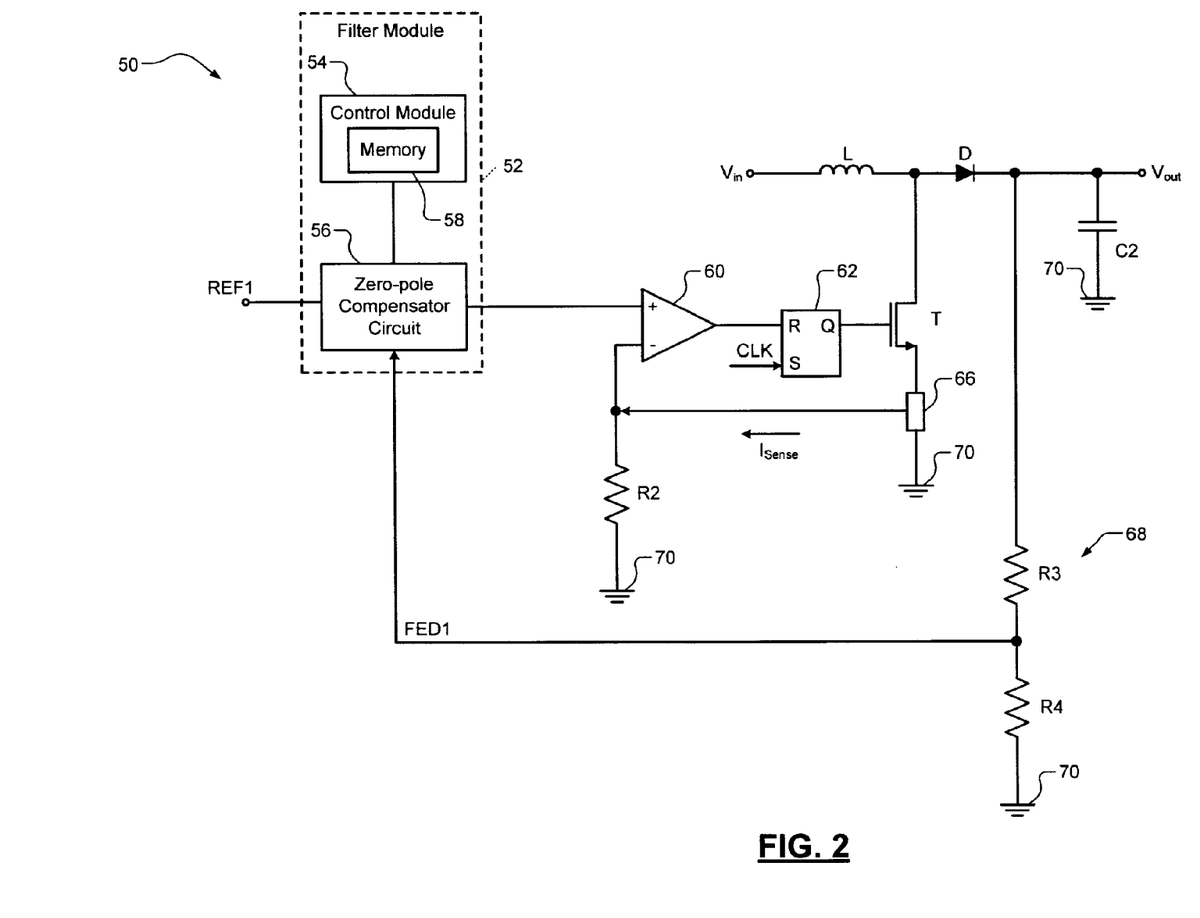
FIG. 2 is a DC-to-DC converter incorporating a filter module in accordance with the present disclosure.

FIG. 2 shows a DC-to-DC converter 50 incorporating a filter module 52. Although the filter module 52 is shown as including a control module 54 and a zero-pole compensator circuit 56, the filter module 52 may include one or more of the other components of the DC-to-DC converter 50. In one implementation, the filter module 52 is an IC. The control module 54 may be used to adjust values of resistances and/or capacitances in the zero-pole compensator circuit 56. The values of the resistances and capacitances may be based on inputs to the control module 54 and/or values stored in memory 58 of the control module 54. As an example, resistance and capacitance values may be provided as control inputs to the control module 54 and used to set the values of the resistance and capacitances in the zero-pole compensator circuit 56. Examples of the zero-pole compensator circuit are shown in FIGS. 4 and 6-8.

The zero-pole compensator circuit 56 receives a reference voltage REF1 and a feedback voltage FED1. A difference between the reference voltage REF1 and the feedback voltage FED1 is referred to as an input voltage to the zero-pole compensator circuit 56. The zero-pole compensator circuit 56 converts the input voltage to a current and then converts the current to an output voltage. The output voltage is filtered by an RC loop filter. Example RC loop filters are provided in FIGS. 4 and 6-8.

The DC-to-DC converter 50 further includes a comparator 60, a SR latch 62, a transistor T, a current sensor 66 and a voltage divider 68. A non-inverting input of the amplifier 60 receives an output of the RC loop filter and/or zero-pole compensator circuit 56. The comparator 60 compares the output of the RC loop filter with the sensed current signal. The SR latch 62 receives a clock signal CLK and latches the output of the amplifier 60, which is received by a control input (or gate) of the transistor T. The clock signal CLK may be from, for example, the control module 54. A drain of the transistor T receives a DC input voltage $V_{in}$ via an inductance L. A source of the transistor T is connected to the current sensor 66. The current sensor is connected between the source and a ground reference 70.

The current sensor 66 is connected between the source of the transistor T and the ground reference 70. The current sensor 66 detects current through the transistor T and provides a feedback signal $I_{Sense}$ to an inverting input of the amplifier 60. A resistance R2 is connected between the inverting input and the ground reference 70.

The voltage divider 68 is connected to the inductance L and the drain of the transistor via a diode D. The voltage divider 68 includes a resistance R3 and a resistance R4. The resistances R3 and R4 are connected in series between the diode D and the ground reference 70. The feedback voltage provided to the zero-pole compensator circuit FED1 is a voltage across the resistance R4.

A capacitance C2 (referred to as a load capacitance) is connected between the diode D and the ground reference 70 and in parallel with the voltage divider 68. A DC output voltage $V_{out}$ of the DC-to-DC converter 50 is taken across the capacitance C2. The DC-to-DC converter 50 converts the DC input voltage $V_{in}$ to provide the DC output voltage $V_{out}$.

Figure 3:
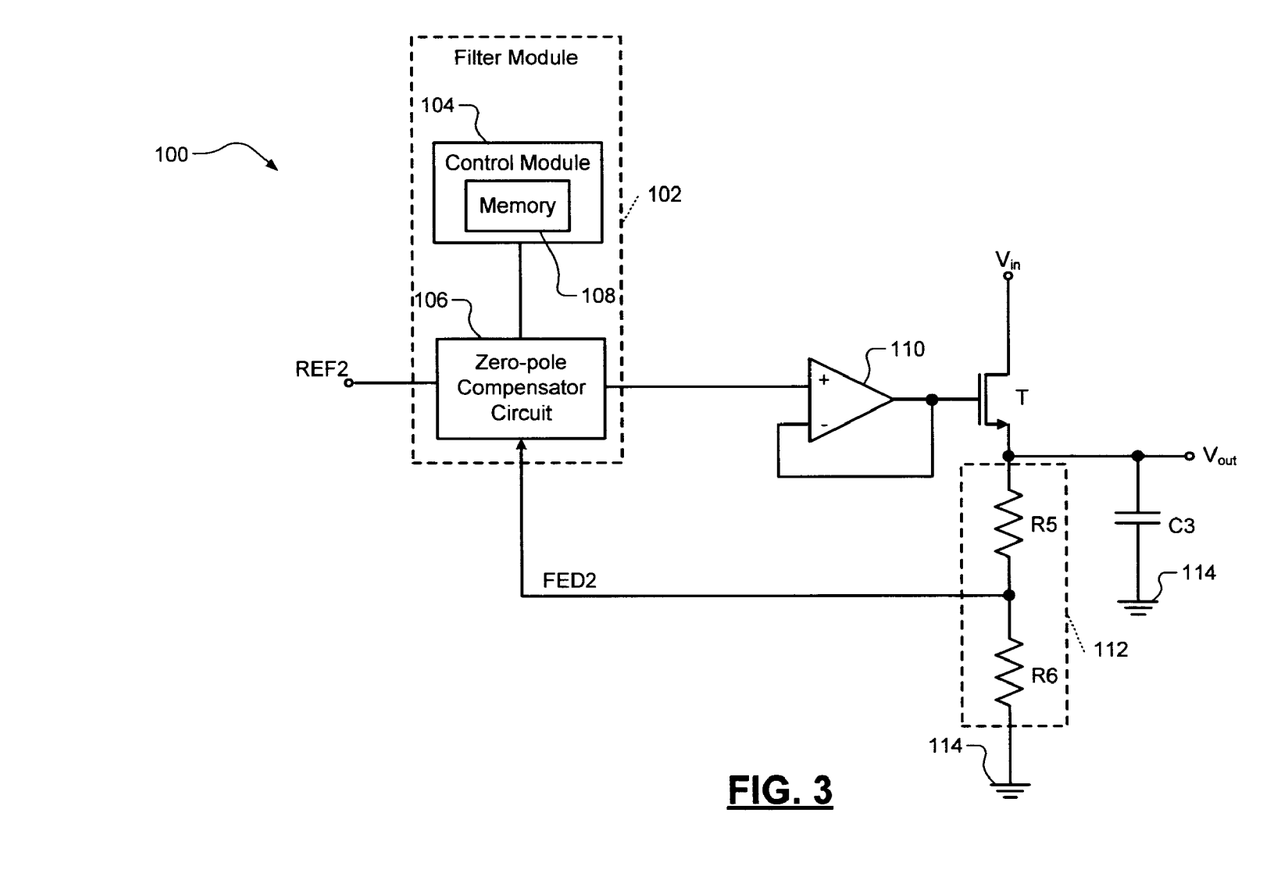
FIG. 3 is a linear voltage regulator incorporating a filter module in accordance with the present disclosure.

FIG. 3 shows a linear voltage regulator 100 incorporating a filter module 102. Although the filter module 102 is shown as including a control module 104 and a zero-pole compensator circuit 106, the filter module 102 may include one or more of the other components of the linear voltage regulator 100. In one implementation, the filter module 102 is an IC. The control module 104 may be used to adjust values of resistances and/or capacitances in the zero-pole compensator circuit 106. The values of the resistances and capacitances may be based on inputs to the control module 104 and/or values stored in memory 108 of the control module 104. As an example, resistance and capacitance values may be provided as control inputs to the control module 104 and used to set the values of the resistance and capacitances in the zero-pole compensator circuit 106. Examples of the zero-pole compensator circuit 106 are shown in FIGS. 4 and 6-8.

The zero-pole compensator circuit 106 receives a reference voltage REF2 and a feedback voltage FED2. A difference between the reference voltage REF2 and the feedback voltage FED2 is referred to as an input voltage to the zero-pole compensator circuit 106. The zero-pole compensator circuit 106 converts the input voltage to a current and then converts the current to an output voltage. The output voltage is filtered by an RC loop filter. Example RC loop filters are provided in FIGS. 4 and 6-8.

The linear voltage regulator 100 further includes a unity gain buffer 110, a transistor T, a voltage divider 112 and a capacitance C3. The unity gain buffer 110 receives the output voltage of the zero-pole compensator circuit 106. Output of the unity gain buffer 110 is provided to a control input (or gate) of the transistor T. A drain of the transistor T is provided with an input voltage $V_{in}$. A source (or output) of the transistor T is connected to the voltage divider 112 and the capacitance C3 and provides an output voltage $V_{out}$. The linear voltage regulator 100 regulates the input voltage $V_{in}$ to provide the output voltage $V_{out}$.

The voltage divider 112 includes resistances R5, R6 and is connected between the source of the transistor T and a ground reference 114. Voltage across the resistance R6 is provided as the feedback voltage FED2 to the zero-pole compensator circuit 106. The capacitance C3 (or load capacitance) is connected between the source of the transistor T and the ground reference 114.

Input voltages and output voltages are described below with respect to FIGS. 4-8, these voltages do not refer to the input voltages and/or output voltages of the above-described DC-to-DC converter and/or a linear voltage regulator of FIGS. 2-3. The input voltages and output voltages of FIGS. 4-8 refer to input voltages and output voltages of respective zero-pole compensator circuits.

Figure 4:
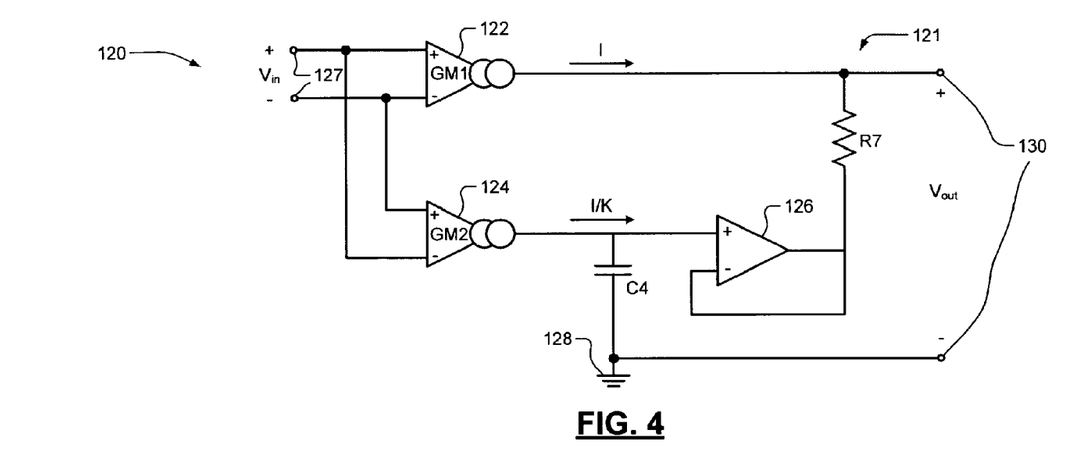
FIG. 4 is a zero-pole compensator circuit incorporating a RC loop filter with unity gain buffering and reduced capacitance in accordance with the present disclosure.

FIG. 4 shows a zero-pole compensator circuit 120 incorporating a RC loop filter 121 with unity gain buffering. The zero-pole compensator circuit 120 includes a capacitance C4 with reduced capacitance relative to the capacitance C1 of the traditional zero-pole compensator circuit 10 of FIG. 1. For the implementation of FIG. 4, the value of the capacitance C4 may be C1/K, where C1 is the capacitance of a traditional RC loop filter (e.g., the RC loop filter 12 of FIG. 1) and K is a constant. The value of K may be preset for an application and/or set by, for example, one of the control modules 54, 104 of FIGS. 2 and 3. This is further described below.

The zero-pole compensator circuit 120 includes a first transconductance amplifier 122, a second transconductance amplifier 124, a unity gain buffer 126, a resistance R7 and the capacitance C4. Each of the transconductance amplifiers 122, 124 has a differential input that receives an input voltage $V_{in}$ at input terminals 127. The input voltage $V_{in}$ is the input voltage to the zero-pole compensator circuit 120. As described above, the input voltage $V_{in}$ may be a difference between a reference voltage (e.g., REF1, REF2 of FIGS. 2 and 3) and a feedback voltage (e.g., FED1, FED2 of FIGS. 2 and 3).

The transconductance amplifiers 122, 124 have respective transconductances GM1, GM2. Each of the transconductance amplifiers 122, 124 has a high output impedance and supplies a respective current I, I/K. The currents I, I/K flow out of the transconductance amplifiers 122, 124. The transconductance GM2 of the second transconductance amplifier 124 may be equal to GM1/K. The value of K for the second transconductance amplifier 124 may be set by, for example, one of the control modules 54, 104 of FIGS. 2, 3. The first transconductance amplifier 122 provides a high-frequency path of the zero-pole compensator circuit 120 and the second transconductance amplifier 124 provides a low frequency path of the zero-pole compensator circuit 120.

The unity gain buffer 126 includes a non-inverting input and an inverting output. The non-inverting input is connected to an output of the second transconductance amplifier 124. The inverting input is connected to an output of the unity gain buffer 126 and to the resistance R7. The output of the unity gain buffer 126 is at an output voltage $V_{buf}$. The resistance R7 is connected (i) between an output of the first transconductance amplifier 122 and the output of the unity gain buffer 126, and (ii) between an output terminal (e.g., one of output terminals 130) of the zero-pole compensator circuit 120 and the output of the unity gain buffer 126. The value of the resistance R7 may be the same as the value of the resistance R1 of FIG. 1.

The capacitance C4 is connected (i) between the output of the second transconductance amplifier 124 and a ground reference 128, and (ii) between the non-inverting input and the ground reference 128. The value of the capacitance C4 may be equal to the value of the capacitance C1 of FIG. 1 divided by K (or C1/K). Voltage $V_{R7}$ across the resistance R7 plus the output voltage $V_{buf}$ provides the output voltage $V_{out}$ of the zero-pole compensator circuit 120 the output terminals 130. The output voltage $V_{buf}$ is voltage across the unity gain buffer 126 plus voltage across the capacitance C4. The second transconductance amplifier 124, the resistance R7, the unity gain buffer 126, and the capacitance C4 provide the RC loop filter 121.

A transfer function of the zero-pole compensator circuit 120 may be represented by equations 2-6, where the transfer function is $V_{out}/V_{in}$ for the zero-pole compensator circuit 120, GM1/K is transconductance of the second transconductance amplifier 124, K/(s·C1) is impedance of the second transconductance amplifier 124, 1/(1+s·T) is a transfer function of the unity gain buffer 126, and T is a constant of the unity gain buffer 126.

$$V_{out} = V_{R7} + V_{buf} \quad (2)$$

$$V_{R7} = V_{in} \cdot GM1 \cdot R7 \quad (3)$$

$$V_{buf} = V_{in} \cdot \frac{GM1}{K} \cdot \frac{K}{s \cdot C1} \cdot \frac{1}{1+s \cdot T} \quad (4)$$

$$V_{out} = [V_{in} \cdot GM1 \cdot R7] + \left[V_{in} \cdot \frac{GM1}{K} \cdot \frac{K}{sC1} \cdot \frac{1}{1+s \cdot T}\right] \quad (5)$$

$$\frac{V_{out}}{V_{in}} = GM1 \cdot \left[\frac{\frac{1}{1+s \cdot T} + s \cdot R7 \cdot C1}{s \cdot C1}\right] \approx GM1 \cdot \frac{1+s \cdot R7 \cdot C1}{s \cdot C1} \quad (6)$$

If bandwidth of the unity gain buffer 126 is large, then T<<R7·C1, which provides the result of equation 5, which is similar to the transfer function of equation 1. As a result, the zero-pole compensator circuit 120 includes the RC loop filter 121 with reduced capacitance and has a single zero and a single pole, which provides stability. The unity gain buffer 126 can perform as a source follower with an offset that does not affect DC precision of the RC loop filter 121 (or active filter). If resistance R7 is equal to the resistance R1, the transfer function of the zero-pole compensator circuit 120 is similar to the transfer function of the zero-pole compensator circuit 10 of FIG. 1.

Figure 5:
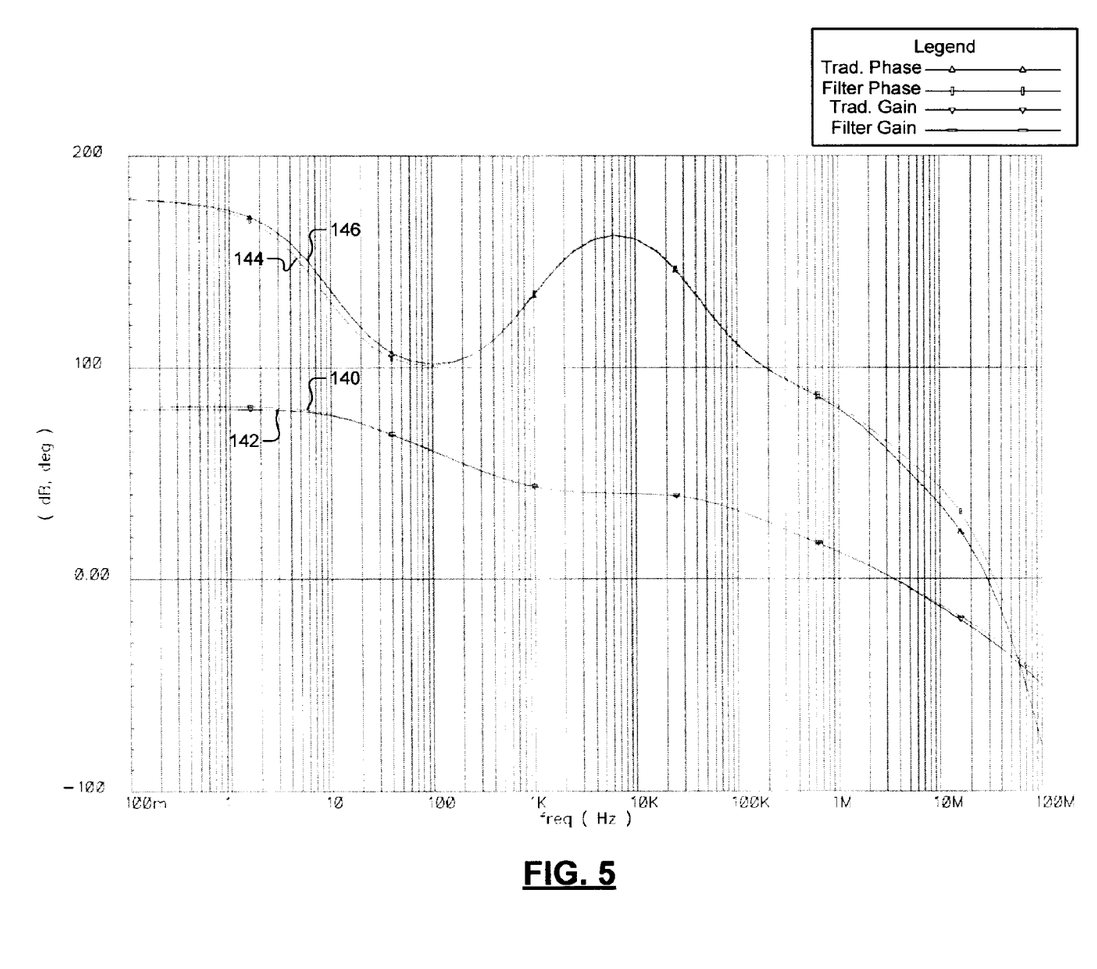
FIG. 5 is a gain and phase versus frequency plot for the traditional zero-pole compensator circuit of FIG. 1 and the Zero-pole compensator circuit of FIG. 4.

FIG. 5 shows a gain and phase versus frequency plot for the traditional zero-pole compensator circuit 10 of FIG. 1 and for the zero-pole compensator circuit 120 of FIG. 4. Four curves are shown including a first gain versus frequency curve 140 and a first phase versus frequency curve 142 for the zero-pole compensator circuit 10. A second gain versus frequency curve 144 and a second phase versus frequency curve 146 for the zero-pole compensator circuit 120 are also shown.

The comparisons between the gain versus frequency curves 140, 142 and comparisons between the phase versus frequency curves 144, 146 shows that operation in the frequency domain of the zero-pole compensator circuits 10, 120 are similar and virtually the same for a typical operating frequency range of a zero-pole compensator circuit. A typical range of a zero-pole compensator circuit is, for example, between 100 hertz (Hz) and 200 kilo-hertz (KHz).

Figure 6:
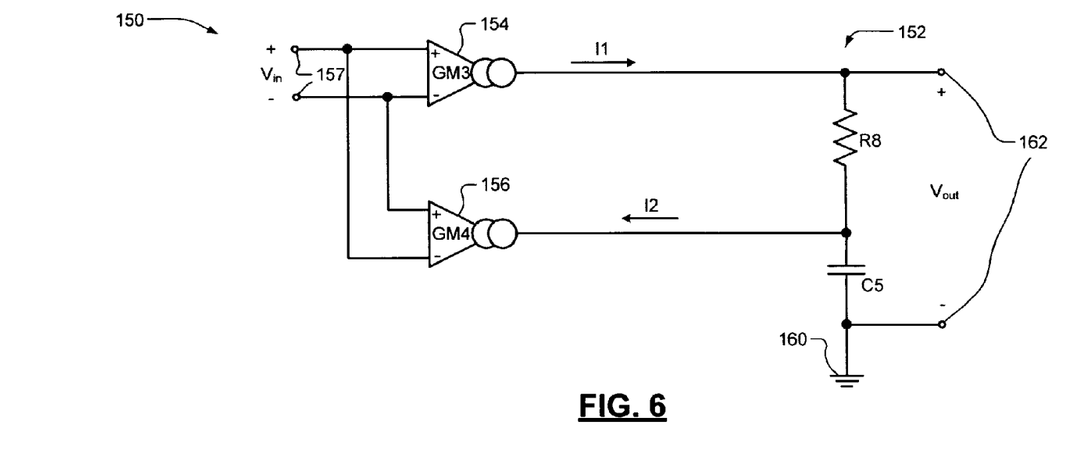
FIG. 6 is a zero-pole compensator circuit incorporating a RC loop filter without unity gain buffering and with reduced capacitance in accordance with the present disclosure.

FIG. 6 shows a zero-pole compensator circuit 150 incorporating a RC loop filter 152 without unity gain buffering. The zero-pole compensator circuit 150 includes a capacitance C5 with reduced capacitance relative to the capacitance of a traditional zero-pole compensator circuit. For the implementation of FIG. 6, the value of the capacitance C5 may be C1/K, where C1 is the capacitance of a traditional RC loop filter (e.g., the RC loop filter 12 of FIG. 1) and K is a constant. The value of K may be preset for an application and/or set by, for example, one of the control modules 54, 104 of FIGS. 2 and 3. This is further described below.

The zero-pole compensator circuit 150 includes a first transconductance amplifier 154, a second transconductance amplifier 156, a resistance R8, and the capacitance C5. The first transconductance amplifier 154 may have a transconductance GM3, which may be equal to the transconductance GM1 of FIG. 4. The second transconductance amplifier 156 may have a transconductance GM4, which may be equal to the transconductance GM1*[(K−1)/K] of FIG. 4. The value of the resistance R8 may be equal to the values of the resistances R1, R7 of FIGS. 1 and 4. The value of the capacitance C5 may be equal to the value of the capacitance C4 (or C1/K) of FIG. 4.

Each of the transconductance amplifiers 154, 156 has a differential input that receives an input voltage $V_{in}$ at input terminals 157. The input voltage $V_{in}$ is the input voltage to the zero-pole compensator circuit 150. As described above, the input voltage $V_{in}$ may be a difference in voltage between a reference voltage (e.g., REF1, REF2 of FIGS. 2 and 3) and a feedback voltage (e.g., FED1, FED2 of FIGS. 2 and 3). The first transconductance amplifier 154 has a high output impedance and supplies a current I1. The second transconductance amplifier 156 has a high output impedance and receives a current I2. The current I1 may be equal to the current I in FIG. 4 and flows out of the first transconductance amplifier 154. The current I2 may be equal to I·[(K−1)/K] and flows into the output of the second transconductance amplifier 156. The transconductance GM4 of the second transconductance amplifier 156 may be equal to GM1/[(K−1)/K] or GM3/[(K−1)/K]. The value of K for the second transconductance amplifier 156 may be set by, for example, one of the control modules 54, 104 of FIGS. 2, 3. The first transconductance amplifier 154 provides a high-frequency path of the zero-pole compensator circuit 150 and the second transconductance amplifier 156 provides a low frequency path of the zero-pole compensator circuit 150.

The resistance R8 is connected (i) between the outputs of the transconductance amplifiers 154, 156, and (ii) between the output of the first transconductance amplifier 154 and the capacitance C5. The capacitance C5 is connected between the resistance R8 and a ground reference 160. The resistance R8, the capacitance C5, and the second transconductance amplifier 156 provide the RC loop filter 152. Voltage $V_{R8}$ across the resistance R8 plus the voltage $V_{c5}$ across the capacitance C5 provides the output voltage $V_{out}$ of the zero-pole compensator circuit 150 at output terminals 162.

A transfer function of the zero-pole compensator circuit 150 may be represented by equations 7-11, where the transfer function is $V_{out}/V_{in}$ for the zero-pole compensator circuit 150, GM1/K is transconductance of the second transconductance amplifier 156, and K/(s·C4) is impedance of the second transconductance amplifier 156.

$$V_{out}=V_{R8}+V_{C5} \quad (7)$$

$$V_{R8}=V_{in} \cdot GM3 \cdot R8 \quad (8)$$

$$V_{C5} = V_{in} \cdot \left[ GM3 - \frac{GM3 \cdot (K-1)}{K} \right] \cdot \left[ \frac{K}{s \cdot C1} \right] \quad (9)$$

$$V_{out} = [V_{in} \cdot GM3 \cdot R8] + V_{in} \cdot \left[ GM3 - \frac{GM3 \cdot (K-1)}{K} \right] \cdot \left[ \frac{K}{s \cdot C1} \right] \quad (10)$$

$$\frac{V_{out}}{V_{in}} = GM3 \cdot \left[ R8 + \left[ 1 - \frac{(K-1)}{K} \right] \cdot \left[ \frac{K}{s \cdot C1} \right] \right] \approx GM3 \cdot \frac{1 + s \cdot R8 \cdot C1}{s \cdot C1} \quad (11)$$

As a result, the zero-pole compensator circuit 150 includes a RC loop filter 152 with reduced capacitance and has a single zero and a single pole, which provides stability. If resistance R8 is equal to the resistance R1, the transfer function of the zero-pole compensator circuit 150 is similar to the transfer functions of the zero-pole compensator circuits 10, 120 of FIGS. 1 and 4.

The above-described implementations of FIGS. 4 and 6 include reduced capacitance values. The implementations of FIGS. 4 and 6 reduce the capacitance by a factor of K from, for example, C1 to C1/K. If applications call for large capacitance values (greater than a predetermined capacitance), the reduced capacitances of FIGS. 4 and 6 allow for the incorporation of the Zero-pole compensator circuits including the capacitances to be implemented on silicon layers of an IC.

Figure 7:
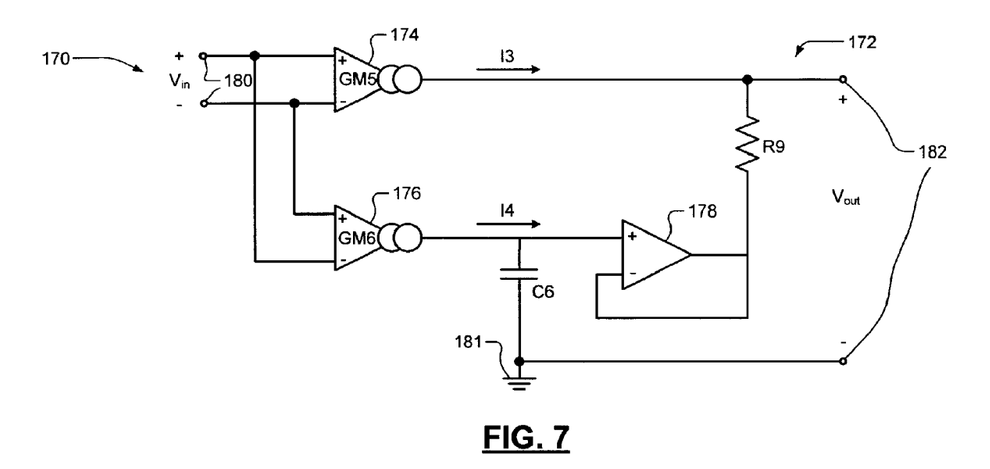
FIG. 7 is a zero-pole compensator circuit incorporating a RC loop filter with unity gain buffering and reduced resistance and capacitance in accordance with the present disclosure.
Figure 8:
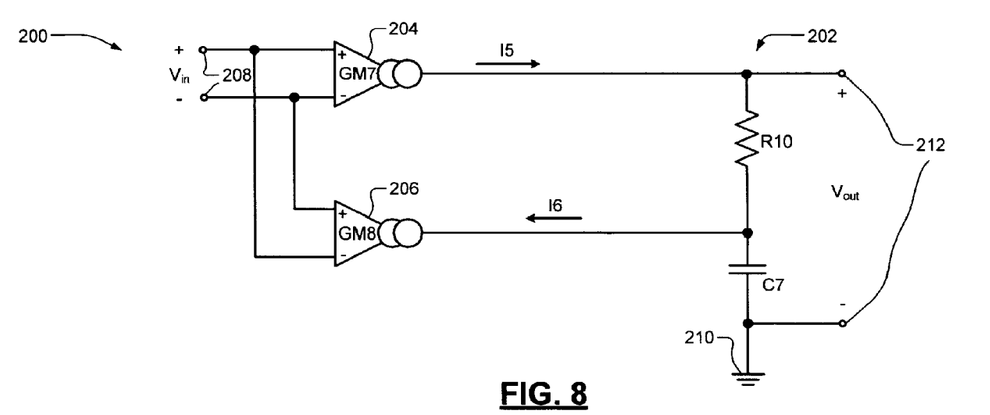
FIG. 8 is a zero-pole compensator circuit incorporating a RC loop filter without unity gain buffering and with reduced resistance and capacitance in accordance with the present disclosure.

The following implementations of FIGS. 7 and 8 provide zero-pole compensator circuits with reduced resistance and may have reduced capacitance. FIG. 7 shows a zero-pole compensator circuit 170 incorporating a RC loop filter 172 with unity gain buffering. The zero-pole compensator circuit 170 includes a resistance R9 with reduced resistance relative to the resistance R1 of the traditional zero-pole compensator circuit 10 of FIG. 1. For the implementation of FIG. 7, the value of the resistance R9 may be R1/K1, where R1 is the resistance of a traditional RC loop filter (e.g., the RC loop filter 12 of FIG. 1) and K1 is a constant. The value of K1 may be preset for an application and/or set by, for example, one of the control modules 54, 104 of FIGS. 2 and 3. This is further described below.

The zero-pole compensator circuit 170 includes a first transconductance amplifier 174, a second transconductance amplifier 176, a unity gain buffer 178, the resistance R9 and a capacitance C6. Each of the transconductance amplifiers 174, 176 has a differential input that receives an input voltage $V_{in}$ at input terminals 180. The input voltage $V_{in}$ is the input voltage to the zero-pole compensator circuit 170. As described above, the input voltage $V_{in}$ may be a difference in voltage between a reference voltage (e.g., REF1, REF2 of FIGS. 2 and 3) and a feedback voltage (e.g., FED1, FED2 of FIGS. 2 and 3). The transconductance amplifiers 174, 176 have respective transconductances GM5, GM6. The transconductance GM5 of the first transconductance amplifier 174 may be equal to GM1·K1 when the capacitance C6 is equal to C1/K2. The transconductance GM6 of the second transconductance amplifier 176 may be equal to GM1/K2. The transconductance GM5 of the first transconductance amplifier 174 may be equal to the transconductance GM6·K1 if capacitance of C7 is not reduced and/or is equal to capacitance C1. The transconductance GM6 may be equal to the transconductance GM1 of the transconductance amplifier 14 of FIG. 1 if capacitance of C7 is not reduced and/or is equal to capacitance C1.

Each of the transconductance amplifiers 174, 176 has a high output impedance and supplies a respective current I3, I4. The current I3 may be equal to the current I of FIG. 1 multiplied by the factor K1 (or I·K1). The current I4 may be equal to (i) the current I of FIG. 1 if the capacitance C7 is equal to the capacitance C1, or (ii) the current I divided by K2 (or I/K2) if the capacitance C6 is equal to C1/K2. The currents I3, I4 flow out of the transconductance amplifiers 174, 176. The values of K1 and K2 for the transconductance amplifiers 174, 176 may be set by, for example, one of the control modules 54, 104 of FIGS. 2, 3. The first transconductance amplifier 174 provides a high-frequency path of the zero-pole compensator circuit 170 and the second transconductance amplifier 176 provides a low frequency path of the zero-pole compensator circuit 170.

The unity gain buffer 178 includes a non-inverting input and an inverting output. The non-inverting input is connected to an output of the second transconductance amplifier 176. The inverting input is connected to an output of the unity gain buffer 178 and to the resistance R9. The output of the unity gain buffer 178 is at an output voltage $V_{buf}$. The resistance R9 is connected (i) between an output of the first transconductance amplifier 174 and the output of the unity gain buffer 178, and (ii) between an output terminal (e.g., one of output terminals 182) of the zero-pole compensator circuit 170 and the output of the unity gain buffer 178.

The capacitance C6 is connected (i) between the output of the second transconductance amplifier 176 and a ground reference 181, and (ii) between the non-inverting input and the ground reference 181. The value of the capacitance C6 may be equal to the value of the capacitance C1 of FIG. 1 or capacitance C1/K2. Voltage $V_{R9}$ across the resistance R9 plus the output voltage $V_{buf}$ provides the output voltage $V_{out}$ of the zero-pole compensator circuit 170 the output terminals 182. The second transconductance amplifier 176, the resistance R9, the unity gain buffer 178, and the capacitance C6 provide the RC loop filter 172.

A transfer function of the zero-pole compensator circuit 170 may be represented by equations 12-16, where the transfer function is $V_{out}/V_{in}$ for the zero-pole compensator circuit 170, impedance of the resistance R9 may be R1/K1, 1/(s·C1/K2) may be impedance of the capacitance C6, 1/(1+s·T) is a transfer function of the unity gain buffer 178, and T is a constant of the unity gain buffer 178.

$$V_{out} = V_{R9} + V_{buf} \tag{12}$$

$$V_{R9} = V_{in} \cdot GM6 \cdot K1 \cdot \frac{R1}{K1} \tag{13}$$

$$V_{buf} = V_{in} \cdot GM6 \cdot K1 \cdot \frac{K2}{s \cdot C1} \tag{14}$$

$$V_{out} = \left[V_{in} \cdot GM6 \cdot K1 \cdot \frac{R1}{K1}\right] + \left[V_{in} \cdot GM6 \cdot \frac{K2}{s \cdot C1}\right] \tag{15}$$

$$\frac{V_{out}}{V_{in}} = GM6 \cdot \left[R1 + \frac{K2}{s \cdot C1} \cdot \frac{1}{1+s \cdot T}\right] \approx GM6 \cdot \frac{1 + s \cdot R1 \cdot C1}{s \cdot C1} \tag{16}$$

FIG. 8 shows a Zero-pole compensator circuit 200 incorporating a RC loop filter 202 without unity gain buffering and reduced resistance and may have reduced capacitance. The Zero-pole compensator circuit 200 includes a resistance R10 with reduced resistance relative to the resistance of a traditional Zero-pole compensator circuit. For the implementation of FIG. 8, the value of the resistance R10 may be R1/K1, where R1 is the resistance of a traditional RC loop filter (e.g., the RC loop filter 12 of FIG. 1) and K1 is a constant. The value of K1 may be preset for an application and/or set by, for example, one of the control modules 54, 104 of FIGS. 2 and 3. This is further described below.

The Zero-pole compensator circuit 200 includes a first transconductance amplifier 204, a second transconductance amplifier 206, the resistance R10, and a capacitance C7. The transconductance amplifiers 204, 206 have respective transconductances GM7, GM8. The value of the capacitance C7 may be equal to the value of the capacitance C1 of FIG. 1 or C1/K2. The transconductance GM7 of the first transconductance amplifier 204 may be equal to the transconductance GM8·K if the capacitance is not reduced and/or equal to C1.

The transconductance GM7 of the first transconductance amplifier 204 may be equal to GM1·K1. The transconductance GM8 may be equal to the transconductance GM1 of the transconductance amplifier 14 of FIG. 1 if the capacitance is not reduced and/or equal to C1. The transconductance GM8 of the second transconductance amplifier 206 may be equal to GM1·[(K1−(1/K2)] when C7 is equal to C1/K2.

Each of the transconductance amplifiers 204, 206 has a differential input that receives an input voltage $V_{in}$ at input terminals 208. The input voltage $V_{in}$ is the input voltage to the Zero-pole compensator circuit 200. As described above, the input voltage $V_{in}$ may be a difference in voltage between a reference voltage (e.g., REF1, REF2 of FIGS. 2 and 3) and a feedback voltage (e.g., FED1, FED2 of FIGS. 2 and 3). The first transconductance amplifier 204 has a high output impedance and supplies a current I5. The second transconductance amplifier 206 has a high output impedance and receives a current I6. The current I5 may be equal to the current I of FIG. 1 multiplied by the factor K1 (or I·K1) and flows out of the first transconductance amplifier 204. The current I6 may be equal to (i) the current I of FIG. 1 multiplied by K−1 (or I·(K−1) if C7 is equal to C1, or (ii) the current I multiplied by [(K1−(1/K2)] if the capacitance C7 is equal to C1/K2. The current I6 flows into the output of the second transconductance amplifier 206.

The value of K for the transconductance amplifiers 204, 206 may be set by, for example, one of the control modules 54, 104 of FIGS. 2, 3. The first transconductance amplifier 204 provides a high-frequency path of the Zero-pole compensator circuit 200 and the second transconductance amplifier 206 provides a low frequency path of the Zero-pole compensator circuit 200.

The resistance R10 is connected (i) between the outputs of the transconductance amplifiers 204, 206, and (ii) between the output of the first transconductance amplifier 204 and the capacitance C7. The capacitance C7 is connected between the resistance R10 and a ground reference 210. The resistance R10, the capacitance C7, and the second transconductance amplifier 206 provide the RC loop filter 202. Voltage $V_{R10}$ across the resistance R10 plus the voltage $V_{C7}$ across the capacitance C7 provides the output voltage $V_{out}$ of the Zero-pole compensator circuit 200 at output terminals 212.

A transfer function of the Zero-pole compensator circuit 200 may be represented by equations 17-21, where the transfer function is $V_{out}/V_{in}$ for the Zero-pole compensator circuit 200, R1/K1 may be impedance of the resistance R10, GM1·K1 may be transconductance of the first transconductance amplifier 204, GM1·[(K1−(1/K2)] may be transconductance of the second transconductance amplifier 206, and 1/(s·C1/K2) may impedance of the capacitance C7.

$$V_{out} = V_{R10} + V_{C7} \tag{17}$$

$$V_{R10} = V_{in} \cdot GM1 \cdot K1 \cdot \frac{R1}{K1} \tag{18}$$

$$V_{C7} = V_{in} \cdot [(GM1 \cdot K1) - (GM1 \cdot (K1 - 1/K2))] \cdot \left[\frac{K2}{s \cdot C1}\right] \tag{19}$$

$$V_{out} = \left[V_{in} \cdot GM1 \cdot K1 \cdot \frac{R1}{K1}\right] + \qquad (20)$$

$$\left[V_{in} \cdot [(GM1 \cdot K1) - (GM1 \cdot (K1 - 1/K2))] \cdot \left[\frac{K2}{s \cdot C1}\right]\right]$$

$$\frac{V_{out}}{V_{in}} = \qquad (21)$$

$$GM1 \cdot \left[R1 + \frac{K1 + K2}{s \cdot C1} - \left[\frac{K1 \cdot K2 - 1}{s \cdot C1}\right]\right] = GM1 \cdot \left[\frac{1 + s \cdot R1 \cdot C1}{s \cdot C1}\right]$$

The above-described implementations provide Zero-pole compensator circuits with capacitor and/or resistor sizes and/or associated areas that can be reduced by a factor, such as K, K1, K2. This can reduce the size of associated analog circuits. The implementations allow for Zero-pole compensator circuits with large resistances and/or capacitances to be incorporated on an IC. This reduces the number of external pins of an IC and components external to the IC. This large RC values allow maintenance of circuit stability. The RC values may be programmable via the disclosed control modules, which can further increase the number of applications in which the implementations may be utilized.

Various equations and/or relationships between elements (variables, parameters and/or constants) are disclosed herein. Although a relationship between a first one or more elements and a second one or more elements may be represented using an equation, in practice elements on a first side of the equation may not be exactly equal to elements on a second side of the equation. However, the elements on the first side of the equation may be approximately equal to or within a predetermined range of the elements on the second side of the equation. The predetermined range may be set via a corresponding control module.

Although the terms first, second, third, etc. may be used herein to describe various voltages, currents, transconductances, and/or circuit elements, these items should not be limited by these terms. These terms may be only used to distinguish one item from another item. Terms such as "first," "second," and other numerical terms when used herein do not imply a sequence or order unless clearly indicated by the context. Thus, a first item discussed herein could be termed a second item without departing from the teachings of the example implementations.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A compensator circuit comprising:
    a first transconductance amplifier to convert an input voltage to a first output current;
    a second transconductance amplifier to convert the input voltage to a second output current;
    a buffer comprising a non-inverting input and an output, wherein the non-inverting input of the buffer receives the second output current;
    a resistance connected between an output of the first transconductance amplifier and the output of the buffer; and
    a capacitance connected (i) between an output of the second transconductance amplifier and a terminal at a reference potential, and (ii) between the non-inverting input of the buffer and the terminal,
    wherein an output voltage of the compensator circuit is based on the first output current and is a voltage across the resistance, the buffer and the capacitance.

2. The compensator circuit of claim 1, wherein:
    a first transconductance of the first transconductance amplifier divided by a constant is within a predetermined range of a second transconductance of the second transconductance amplifier; and
    the first output current divided by the constant is within a predetermined range of the second output current.

3. The compensator circuit of claim 1, wherein:
    a first transconductance of the second transconductance amplifier multiplied by a constant is within a predetermined range of a second transconductance of the first transconductance amplifier; and
    the second output current multiplied by the constant is within a predetermined range of the first output current.

4. The compensator circuit of claim 1, wherein:
the output of the buffer provides a buffer output voltage;
the output voltage of the compensator circuit is a sum of the voltage across the resistance and the buffer output voltage; and
the buffer is a unity gain buffer.

5. The compensator circuit of claim 1, wherein:
a first voltage is across the resistance;
a second voltage is across the buffer;
a third voltage is across the capacitance; and
the output voltage of the compensator circuit is a sum of the first voltage, the second voltage and the third voltage.

6. The compensator circuit of claim 1, wherein:
the resistance is directly connected to an output of the first transconductance amplifier and directly to the output of the buffer;
the capacitance is directly connected to the output of the second transconductance amplifier and the non-inverting input of the buffer; and
the non-inverting input of the buffer is directly connected to the output of the second transconductance amplifier.

7. An integrated circuit comprising:
the compensator circuit of claim 1; and
a control module configured to set values of the resistance and the capacitance.

8. A direct current (DC)-to-DC converter comprising:
the compensator circuit of claim 1; and
a second circuit configured to convert a first DC voltage to a second DC voltage based on the output voltage of the compensator circuit.

9. The DC-to-DC converter of claim 8, wherein:
the second circuit provides a feedback voltage to the compensator circuit; and
the input voltage is a difference between a reference voltage and the feedback voltage.

10. A voltage regulator comprising:
the compensator circuit of claim 1; and
a second circuit configured to regulate a first voltage to provide a second voltage based on the output voltage of the compensator circuit.

11. The voltage regulator of claim 10, wherein:
the second circuit provides a feedback voltage to the compensator circuit; and
the input voltage is a difference between a reference voltage and the feedback voltage.

12. A compensator circuit comprising:
a first transconductance amplifier comprising a first output and converting an input voltage to a first current;
a second transconductance amplifier comprising an input and a second output, wherein the input of the second transconductance amplifier receives the input voltage, and wherein the second output receives a second current;
a resistance connected between the first output of the first transconductance amplifier and the second output of the second transconductance amplifier,
wherein a portion of the first current is provided as the second current and directed from the resistance to the second output of the second transconductance amplifier; and
a capacitance connected (i) between the second output of the second transconductance amplifier and a terminal at a reference potential, and (ii) between the resistance and the terminal, wherein the capacitance is connected in series with the resistance between the first output of the first transconductance amplifier and the terminal, and
wherein an output voltage of the compensator circuit is a voltage across the resistance and the capacitance.

13. The compensator circuit of claim 12, wherein:
a first transconductance of the first transconductance amplifier minus a result of the first transconductance divided by a constant is within a predetermined range of a second transconductance of the second transconductance amplifier; and
the first current minus a result of the first current divided by the constant is within a predetermined range of the second current.

14. The compensator circuit of claim 12, wherein:
a first transconductance of the first transconductance amplifier divided by a constant is within a predetermined range of a second transconductance of the second transconductance amplifier divided by a result of the constant minus one; and
the first current divided by the constant is within a predetermined range of the second current divided by a result of the constant minus one.

15. The compensator circuit of claim 12, wherein:
a first voltage is across the resistance;
a second voltage is across the capacitance; and
the output voltage of the compensator circuit is a sum of the first voltage and the second voltage.

16. The compensator circuit of claim 12, wherein:
the resistance is directly connected to the first output of the first transconductance amplifier and directly to the second output of the second transconductance amplifier; or
the capacitance is directly connected to (i) the output of the second transconductance amplifier, (ii) the resistance, and (iii) the terminal.

17. An integrated circuit comprising:
the compensator circuit of claim 12; and
a control module configured to set values of the resistance and the capacitance.

18. A direct current (DC)-to-DC converter comprising:
the compensator circuit of claim 12; and
a second circuit configured to convert a first DC voltage to a second DC voltage based on the output voltage of the compensator circuit.

19. The DC-to-DC converter of claim 18, wherein:
the second circuit provides a feedback voltage to the compensator circuit; and
the input voltage is a difference between a reference voltage and the feedback voltage.

20. A voltage regulator comprising:
the compensator circuit of claim 12; and
a second circuit configured to regulate a first voltage to provide a second voltage based on the output voltage of the compensator circuit,
wherein the second circuit provides a feedback voltage to the compensator circuit, and
wherein the input voltage is a difference between a reference voltage and the feedback voltage.

21. The compensator circuit of claim 1, wherein:
the buffer comprises an inverting input;
the inverting input of the buffer is connected to the output of the buffer; and
the buffer is a unity gain buffer.

22. The compensator circuit of claim 1, wherein:
the resistance is directly connected to (i) the output of the first transconductance amplifier, and (ii) the output of the buffer; and
capacitance is directly connected to (i) the non-inverting input of the buffer, (ii) the output of the second transconductance amplifier, and (iii) the terminal.

* * * * *

UNITED STATES PATENT AND TRADEMARK OFFICE
CERTIFICATE OF CORRECTION

| | |
|---|---|
| PATENT NO. | : 9,086,710 B1 |
| APPLICATION NO. | : 13/759298 |
| DATED | : July 21, 2015 |
| INVENTOR(S) | : Andrea Milanesi et al. |

It is certified that error appears in the above-identified patent and that said Letters Patent is hereby corrected as shown below:

Title Page:
Item (72) Inventors, Line 2        Delete "Assago" and insert --Assago, MI--

In the Specification:
Column 1, Line 27        After "voltage", insert --$V_{in}$--
Column 1, Line 39        Before "is", insert --, ω-- (first occurrence)

Column 6, Equation 5     Delete "$V_{out} = [V_{in} \cdot GM1 \cdot R7] + \left[ V_{in} \cdot \frac{GM1}{K} \cdot \frac{K}{sC1} \cdot \frac{1}{1+s \cdot T} \right]$," and insert -- $V_{out} = [V_{in} \cdot GM1 \cdot R7] + \left[ V_{in} \cdot \frac{GM1}{K} \cdot \frac{K}{s \cdot C1} \cdot \frac{1}{1+s \cdot T} \right]$ --

Column 6, Line 38        Delete "142" and insert --144--
Column 6, Line 39        Delete "144," and insert --142,--
Column 7, Line 31        Delete "$V_{c5}$" and insert --$V_{C5}$--

In the Claims:
Column 13, Line 26, Claim 8        Delete "(DC)" and insert --DC--
Column 14, Line 35, Claim 18       Delete "(DC)" and insert --DC--

Signed and Sealed this
First Day of March, 2016

Michelle K. Lee
*Director of the United States Patent and Trademark Office*